(No Model.)
W. SHAPLEIGH.
PROCESS OF MAKING LEAD CHLORIDE.
No. 412,800. Patented Oct. 15, 1889.
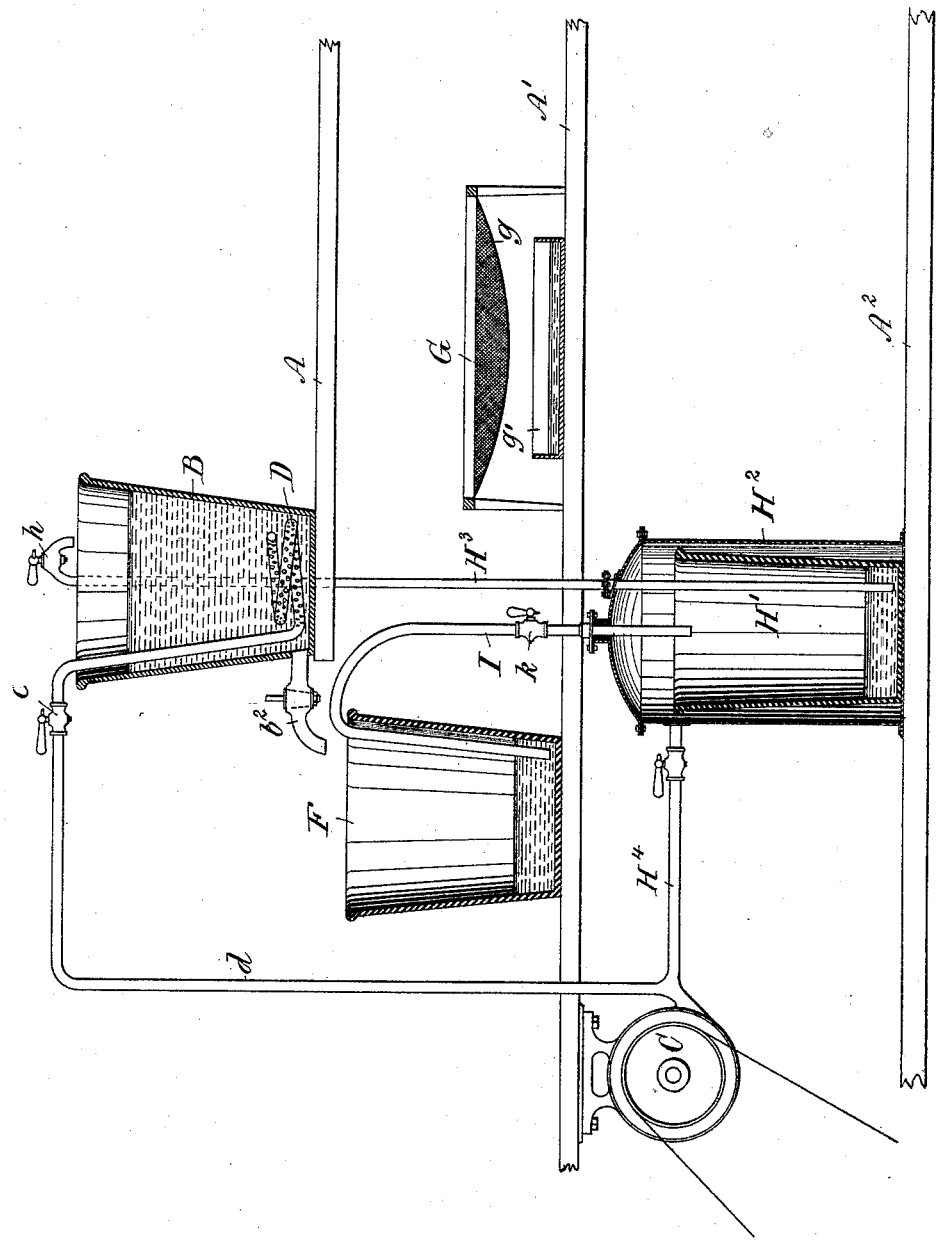

UNITED STATES PATENT OFFICE.

WALDRON SHAPLEIGH, OF CAMDEN, ASSIGNOR TO THE ELECTRIC STORAGE BATTERY COMPANY, OF GLOUCESTER CITY, NEW JERSEY.

PROCESS OF MAKING LEAD CHLORIDE.

SPECIFICATION forming part of Letters Patent No. 412,800, dated October 15, 1889.

Application filed April 9, 1889. Serial No. 306,543. (No specimens.)

*To all whom it may concern:*

Be it known that I, WALDRON SHAPLEIGH, a citizen of the United States, residing at Camden, in the county of Camden and State of New Jersey, have invented certain new and useful Improvements in the Method of Producing Chloride of Lead, of which the following is a specification.

Heretofore chloride of lead has generally been made by dissolving granulated lead obtained by dropping a mass of molten lead from a height into a vessel of water in dilute nitric acid, thereby forming lead nitrate, which is held in solution by the liquor, the solution of lead nitrate being then drawn off and hydrochloric acid added thereto in a quantity sufficient to react upon the solution of lead nitrate. By this reaction the chlorine unites with the lead to form chloride of lead—a white crystalline precipitate, which settles rapidly in the bottom of the vessel—and the liberated nitric acid, together with a greater or less quantity of free hydrochloric acid which may have been added in excess of the quantity required to precipitate the lead nitrate, being held in the superincumbent liquor. The latter is then drawn off into a suitable vessel and preserved for use in dissolving a fresh charge of granulated lead. The chloride of lead is then removed and washed with a small quantity of cold water, in which it is but slightly soluble, for use.

The above-described method of making chloride of lead possesses several serious disadvantages. For example, the granulation of the lead by dropping the molten metal from a height into water produces a powder consisting of grains or granules of irregular size and of leaf-like shape having a thick mass of metal similar to a shot at the center thereof. Such grains or granules are slowly and imperfectly dissolved even in a solution of pure nitric acid. Therefore if the nitric acid be not pure but contains hydrochloric acid, as is frequently the case when nitric acid has been previously used in the manufacture of the chloride of lead, the granules or grains of metallic lead when introduced into such liquor before they entirely dissolve in the nitric acid are attacked by the hydrochloric acid, thereby becoming coated with chloride of lead, which coating prevents further action of the nitric acid, and collects, forming a mass of insoluble matter. This mass of material, composed of lead granules coated with chloride of lead, is removed from the vessel as a residue to be reduced to a metallic state by a smelting operation. The latter process is not only difficult but also expensive, and occasions a loss of the hydrochloric acid.

The action of an aqueous solution of nitric acid upon metallic lead powder in a vessel of a construction such as has been usually used for this purpose causes first the deoxidation of a portion of the nitric acid, which is estimated at about twenty-five per cent., the metal being oxidized, and the oxide so formed is dissolved by the rest of the nitric acid forming lead nitrate, while the deoxidized nitric acid, which becomes nitric oxide, passes off from the liquor now heated by the above-described chemical action into the air. From the latter the nitric oxide absorbs oxygen, thereby forming nitric peroxide—a dense, irritating, offensive, and poisonous orange-colored gas. In the conduct of the above-described method not only is a considerable quantity of nitric acid wasted or lost, but also the health of the workmen is impaired by the fumes of nitric peroxide rising from the surface of the hot liquor.

The principal objects of my invention are to obviate the above-mentioned serious results heretofore obtained and to manufacture chloride of lead by dissolving metallic lead powder in an aqueous solution of nitric acid and to precipitate the lead chloride therefrom by the addition of hydrochloric acid, to hasten and finally attain a more perfect dissolution of the lead powder by its union with the nitric acid, and to counteract the formation of nitric peroxide fumes, and consequent injury to the health of the workmen, and to avoid the unnecessary loss of the nitric acid.

My invention consists in introducing a blast or stream of air into an aqueous solution of nitric acid while powdered or pulverized lead is being added thereto and chemical action is going on for the ultimate manufacture, as a finished product, of chloride of lead.

My invention further consists in adding to an aqueous solution of nitric acid and an excess of hydrochloric acid previously added, but not uniting with lead nitrate to form as a finished product chloride of lead, a solution of lead nitrate before using such aqueous solution to dissolve a fresh charge of pulverized lead, and introducing a blast or stream of air into the aqueous solution of nitric acid after it has been freed of the excess of hydrochloric acid and while the pulverized lead is being added to said aqueous solution and chemical action is going on.

My invention further consists in introducing, while the hydrochloric acid is being used for decomposing the lead nitrate, a blast of air to oxidize the acids freed from the salts of lead containing less oxygen than the nitrate of lead.

To carry my invention into effect I mix in a suitable vessel nitric acid with water. I have obtained in practice good results by mixing one part of nitric acid with about five parts of water. However, as the water is added to the solution for the purpose of preventing the lead nitrate from assuming a crystallized form, when the acidity of the liquor is neutralized, the above proportion of one part of acid to about five parts of water may be varied, and will largely depend upon the temperature of the liquor. Into this aqueous solution of nitric acid I slowly introduce finely-powdered lead, and during the introduction of the powdered lead a strong blast or stream of air is forced into and through the liquor. The mechanical action of the blast or stream of air is to agitate and cool the liquor. The chemical action which ensues is as follows: First, a portion of the nitric acid is deoxidized by the lead and the metal is oxidized, and the oxide so formed is dissolved by the rest of the nitric acid, forming lead nitrate, while the nitric-oxide compounds, liberated by the action of the nitric acid in oxidizing the lead while in the nascent state, unite with the oxygen of the incoming air to form compounds containing nitric acid, which are dissolved in the liquor before escaping therefrom into the atmosphere. When a sufficient quantity of lead powder has been introduced to unite with the free nitric acid, the introduction of the lead powder is stopped, the blast of air is turned off, and the resulting solution of lead nitrate drawn off into vessels, a small quantity into one and the remainder into another. The small quantity of the solution of lead nitrate is saved for a use to be hereinafter explained, and to the larger quantity of the liquor is added sufficient hydrochloric acid to react upon the lead nitrate to decompose the latter and unite with the lead to form chloride of lead—a white crystalline precipitate—which collects in the bottom of the vessel, while at the same time is set free the nitric acid which remains in solution in the liquor. However, it is very difficult to add the exact quantity of hydrochloric acid necessary to unite with the lead, and in practice this acid is often added in excess. In such cases the solution will contain not only nitric acid but also a certain percentage of free hydrochloric acid. To remove this free acid and to render the solution of nitric acid fit for use in the reduction of a fresh charge of powdered lead, the liquor is drawn off and mixed with a small quantity of the lead nitrate, which was saved, as above described, whereby the lead is attacked by the hydrochloric acid and precipitated from the solution as chloride of lead, thereby freeing the solution from hydrochloric acid. The liquor may then be used to dissolve fresh charges of lead, and the process may be repeated until it becomes so impregnated with foreign impurities as to render its use no longer economical. The chloride of lead is then removed and washed with a small quantity of cold water, in which it is but slightly soluble, for use.

In the accompanying drawing is illustrated in vertical longitudinal section a form of apparatus which has been found practically efficient for the conduct of the above-described process. The horizontal shelves or floors A, A', and $A^2$ are arranged in tiers, and constitute the frame-work upon which the apparatus rests. Upon the shelf A is placed a tank B, provided with a spigot $b^2$, and into which tank is introduced an agitator or perforated coiled pipe D, leading from the blower C, and provided with a valve-cock $c$. The vessel F is supported upon the shelf A, beneath the spigot $b^2$. Upon the shelf A' is also placed a filter G, provided with a blanket $g$ and a drip-cup $g'$. The container H', inclosed in an air-tight casing $H^2$, is placed upon the shelf $A^2$. A siphon I, provided with a valve-cock $k$, extends from near the bottom of the tank F through the air-tight casing $H^2$. The pipe $H^3$, provided with a spigot $h$, extends upward from near the bottom of the container H', through the air-tight casing $H^2$, in such manner as to permit of a discharge being made into the tank B.

The method of making chloride of lead according to my invention may be carried out by means of the above-described apparatus as follows: The spigot $b$ and all the valves being closed, nitric acid is mixed with water in the proportion of, say, one part of acid to five parts of water (more or less) in the tank B, and then the valve-cock $c$ in the pipe $d$ is opened and air forced by the blower C through the agitator D. At the same time that a blast of air is admitted finely-powdered lead is slowly introduced into the liquor until all the nitric acid is taken up in the form of nitrate of lead. When this is obtained, the valve $c$ is closed, and the solution is drawn off through the spigot $b^2$ into the tank F, taking care, however, to retain a small quantity of the liquor in the tank B for future use. To the liquor in the tank F is gradually added hydrochloric acid, which causes chloride of lead to be precipitated from the solution of lead nitrate in the form of a white crystalline powder, which settles on the bottom of the vessel F, and the superincumbent liquor containing nitric acid and hydrochloric acid is drawn off through the siphon I into the vessel H'. The chloride of lead is collected and removed from the vessel F, and placed upon the blanket $g$, where it is washed and the water passing off into the drip-receptacle $g'$. In order to repeat the process the valve $c$ and spigot $b^2$ are closed, and by means of the blower C air is forced into the container H' through the pipe $H^4$, thereby causing the liquor to rise through the pipe $H^3$ and to be discharged into the vessel B, where it not only mixes with the lead nitrate previously retained therein, but also forms chloride of lead and free nitric acid, the latter remaining in solution and the former falling to the bottom of the vessel, and may be saved and washed for use. It is obvious that the liquor from the vessel H may be drawn off into another vessel and there treated with the solution of lead nitrate instead of treating it in the vessel B. The nitric acid thus freed from hydrochloric acid may be used to dissolve a fresh charge of lead in repeating the above process until it becomes so charged with foreign or extraneous impurities that its use is no longer practical or economical.

Having thus described the nature and objects of my invention, what I claim as new, and desire to secure by Letters Patent, is—

1. In the manufacture of chloride of lead, introducing a blast of air into an aqueous solution of nitric acid during the admission of finely-divided lead thereto and while the solution is undergoing chemical action, substantially as and for the purposes set forth.

2. In the method of making chloride of lead, adding to a solution of lead nitrate hydrochloric acid and then introducing a blast of air into the same while the chemical reaction is taking place between said lead nitrate and hydrochloric acid, substantially as and for the purposes set forth.

3. In the method of making chloride of lead, precipitating the lead from a solution of lead nitrate in the form of lead chloride by the addition of hydrochloric acid, then introducing a blast of air into said solution during the reaction to oxidize the lower oxides of nitrogen given off during the reaction, and then adding lead nitrate thereto to remove the excess of hydrochloric acid, substantially as and for the purposes described.

In witness whereof I have hereunto set my signature in the presence of two subscribing witnesses.

WALDRON SHAPLEIGH.

Witnesses:
GEO. W. REED,
THOMAS M. SMITH.